US011906806B2

(12) United States Patent
Hurley, IV et al.

(10) Patent No.: US 11,906,806 B2
(45) Date of Patent: Feb. 20, 2024

(54) IMAGING LENS CHECK AND ACTIVE ALIGNMENT METHOD TO MAINTAIN CONSISTENT REAR FOCUSING DISTANCE FOR AN AUTOFOCUS LENS

(71) Applicant: ZEBRA TECHNOLOGIES CORPORATION, Lincolnshire, IL (US)

(72) Inventors: William P. Hurley, IV, New York, NY (US); David T. Shi, Setauket, NY (US); Vladimir Gurevich, Great Neck, NY (US); Igor Vinogradov, Oakdale, NY (US); Carl D. Wittenberg, Water Mill, NY (US); Bryan E. Joles, Selden, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 324 days.

(21) Appl. No.: 17/363,708

(22) Filed: Jun. 30, 2021

(65) Prior Publication Data
US 2023/0003962 A1 Jan. 5, 2023

(51) Int. Cl.
G02B 7/00 (2021.01)
G01B 11/00 (2006.01)
(Continued)

(52) U.S. Cl.
CPC .............. G02B 7/005 (2013.01); G01B 11/00 (2013.01); G02B 7/09 (2013.01); G03B 3/00 (2013.01); G03B 13/36 (2013.01)

(58) Field of Classification Search
CPC .......... G02B 7/005; G02B 7/09; G02B 7/026; G02B 13/0045; G02B 7/08; G02B 7/10;
(Continued)

(56) References Cited

U.S. PATENT DOCUMENTS 11,108,946 B1 8/2021 Gurevich
2013/0258166 A1* 10/2013 Lipson ................. G02B 13/009
348/348

(Continued)

FOREIGN PATENT DOCUMENTS

WO 2014106218 A1 7/2014

OTHER PUBLICATIONS

International Search Report and Written Opinion for International Application No. PCT/US2022/25773 dated Aug. 3, 2022.

Primary Examiner — Christina A Riddle

(57) ABSTRACT

An optical assembly for an autofocus imaging system for capturing at least one image of an object appearing in an imaging field of view (FOV) is provided. The optical assembly includes a front aperture along an optical axis and a front lens group along the optical axis that receives light from the object of interest. The position of the front lens group is adjustable to change a focal distance of the optical assembly. The optical assembly further includes an actuator physically coupled to the front lens group that adjusts the position of the front lens. A rear lens group is disposed along the optical axis to receive the light from the front lens group, and an imaging sensor is disposed at a back focal distance of the rear lens group, to detect the light.

20 Claims, 10 Drawing Sheets

(51) Int. Cl.
*G03B 13/36* (2021.01)
*G03B 3/00* (2021.01)
*G02B 7/09* (2021.01)

(58) Field of Classification Search
CPC ...... G02B 7/102; G02B 7/105; G02B 13/001;
G02B 7/282; G02B 7/003; G02B 7/023;
G02B 7/28; G02B 7/04; G02B 3/04;
G02B 1/041; G01B 11/00; G01B 11/08;
G01B 11/10; G01B 11/105; G01B 11/22;
G01B 9/08; G03B 13/36; G03B 17/14;
G03B 3/00; G03B 17/12; G03B
2205/0046; G03B 3/10; G03B 30/00;
G03B 43/00; G06T 2207/10028; G06T
7/70; G06T 7/00; G06T 7/80; G06T
7/0004; G06K 7/10

USPC ......... 359/823, 824; 356/614–640, 388–401,
356/124–127; 348/345, 357, 346, 347,
348/348, 349, 350, 351, 352, 353, 354,
348/355, 356

See application file for complete search history.

(56) References Cited

U.S. PATENT DOCUMENTS

| | | | |
|---|---|---|---|
| 2014/0152885 A1* | 6/2014 | Nunnink | G02B 1/06 348/345 |
| 2016/0282580 A1* | 9/2016 | Koyama | H04N 23/57 |
| 2017/0038662 A1* | 2/2017 | McKinley | H04N 23/55 |
| 2017/0123178 A1 | 5/2017 | Wang et al. | |
| 2017/0163856 A1* | 6/2017 | Wang | H04N 23/57 |
| 2018/0067278 A1* | 3/2018 | Lipson | G02B 7/10 |
| 2020/0319423 A1* | 10/2020 | Liu | G02B 13/0045 |

* cited by examiner

IMAGING LENS CHECK AND ACTIVE ALIGNMENT METHOD TO MAINTAIN CONSISTENT REAR FOCUSING DISTANCE FOR AN AUTOFOCUS LENS

BACKGROUND

Industrial scanners and/or barcode readers may be used in warehouse environments and/or other similar settings. These scanners may be used to scan barcodes and other objects. Such scanners are typically contained within a chassis to ensure optical components are protected from bumps, falls, and/or other potentially damaging events. In some environments, high powered scanners capable of scanning or resolving barcodes (e.g., 100 ml wide) across a wide range of distances, such as from a few inches to tens of feet, or more, may be desirable. Such systems require larger optics (e.g., imaging lens systems greater than approximately 6 mm in overall diameter) in order to meet performance requirements, but there remains a compromise between the lens system having a specific size while being constrained by the overall dimensions of the housing and the chassis. Also, compact imaging systems require high precision alignment of optics to prevent optical distortion, which can result in reduced efficiency of scanning rates, or faulty equipment. Additionally, each component of an imaging system can have a fabrication error that may cause optical misalignment resulting in reduced image resolution and scanning performance. Larger optics may be more susceptible to higher rates of fabrication errors, while smaller components are less robust to fabrication error with respect to optical alignment.

Accordingly, there is a need for improved optical alignment techniques allowing for improved functionalities of current and future optical systems.

SUMMARY

In accordance with a first aspect, a method of alignment assembly of an imaging system is provided. The method includes positioning a lens holder at a calibrated back flange focal length from a calibration sensor. The calibration sensor is disposed along an optical axis to receive an image thereon, and the lens holder is positioned along the optical axis with a front aperture of the lens holder being along the optical axis and a back flange of the lends holder also along the optical axis. The lens holder contains a front lens group disposed along the optical axis and a rear lens group disposed along the optical axis. The method further includes translating, by an actuator, the front lens group to a plurality of positions along the optical axis while maintaining the rear group in a fixed position relative to the calibration sensor. Translating the front lens group changes a focal distance of the imaging system to focus the image onto the calibration sensor. The method then includes determining, by a processor, a calibrated position of the front lens group, the calibrated position being a position with a calibrated image focused at the calibration sensor; and setting, by the actuator, the front lens group to the calibrated position.

In a variation of the current embodiment, the method further includes re-positioning the lens holder relative to an image sensor at a predetermined distance from the lens holder. In examples, the lens holder is repositioned at the calibrated back flange focal length from the image sensor. In yet more examples, the lens holder is repositioned at a distance from the image sensor, with the distance being determined by a physical spacer disposed between the lens holder and the image sensor. In yet more examples, the current variation includes actively aligning the lens holder to the image sensor.

In variations of the embodiment, the calibrated back flange focal length may be less than 0.25 millimeters, and/or the calibrated back flange focal length has a position tolerance along the optical axis of less than 50 microns.

In some examples, the method may further include actively aligning the lens holder to the image sensor, which may include translating the lens holder in a plane orthogonal to the optical axis to position the image on the image sensor, tilting the lens holder to focus the image on the image sensor, determining a calibrated tilt alignment of the lens holder relative to the image sensor, translating the lens holder in the plane orthogonal to the optical axis to position the image on the image sensor, and determining a calibrated orthogonal position of the lens holder relative to the image sensor.

In a variation of this embodiment, the actuator is one of a voice coil motor, a one-dimension translation stage, a piezoelectric device, a ball-bearing linear motor, or a microelectromechanical systems (MEMS) motor. In examples the actuator has a travel distance of less than 0.5 mm. In further examples the focal distance of the optical assembly may be tuned from between 2 inches and infinity.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
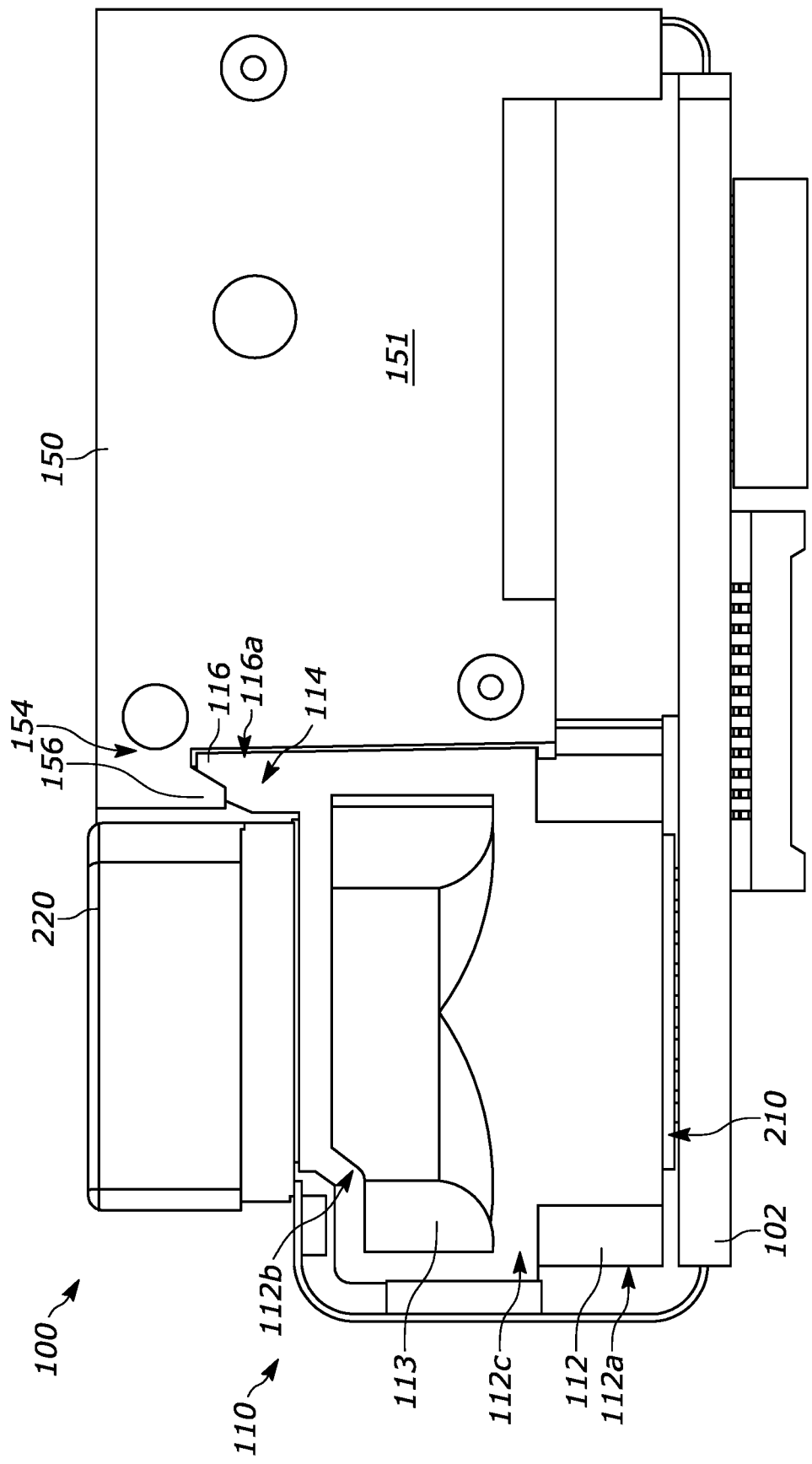
FIG. 1 illustrates a front elevation view of an example imaging assembly of an example scanner for capturing images of an object.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Generally speaking, pursuant to these various embodiments, a method for aligning an autofocus optical system is provided having less alignment error than other optical alignment methods. More specifically, the method described provides very high precision optical alignment allowing for the use of smaller, more compact, lenses and optical elements to fabricate optical systems that have low misalignment tolerances. The methods may also be useful for compensating for fabrication errors in optical systems. Further, the described methods may be implemented on larger optical systems that incorporate larger, higher-powered optical units capable of resolving images (e.g., barcodes and other indicia) disposed at greater distances, and greater ranges of distances, from the optical system.

Figure 2:
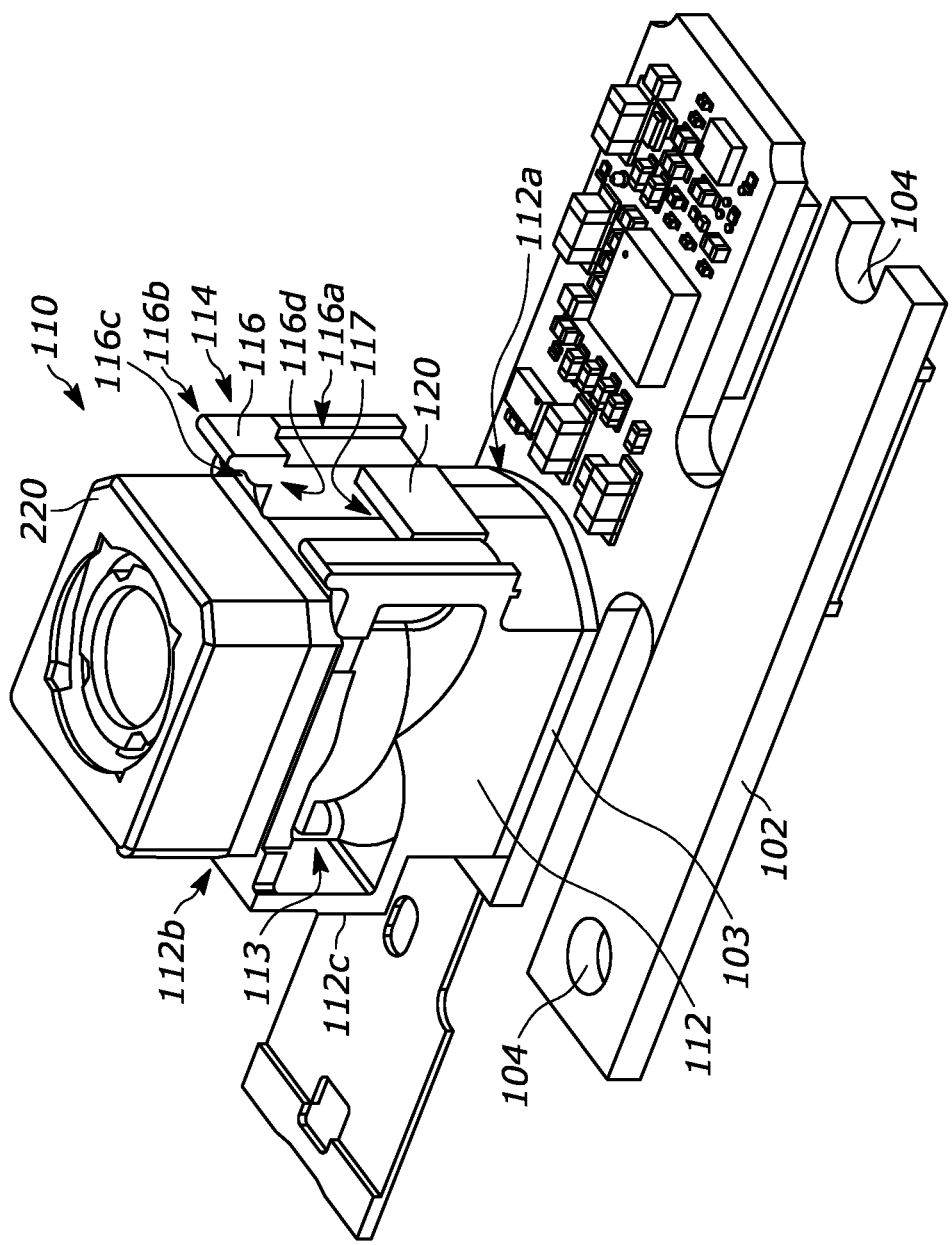
FIG. 2 illustrates a perspective view of the example imaging assembly of FIG. 1 in accordance with various embodiments.

As to the figures, FIG. 1 illustrates a front elevation view of an example imaging assembly 100 of scanner for capturing images of an object in accordance with various embodiments. FIG. 2 illustrates a perspective view of the example imaging assembly 100 of FIG. 1, in accordance with various embodiments. FIG. 2 illustrates an imaging system 110 disposed on a circuit board 102 without including other components of the imaging assembly 100. The assembly 100 or scan engine is an example of an imaging assembly for capturing at least one image of an object appearing in an imaging field of view (FOV). The alignment methods described herein may be used to align optics of the imaging assembly 100. The assembly 100 includes the circuit board 102, the imaging system 110 operably coupled with the circuit board 102, and a chassis 150. Further, in some examples, the system 100 may include an aiming system 170 and an illumination system 180, as well as any number of additional components used to assist with capturing an image or images of an object.

The circuit board 102 may include any number of electrical and/or electro-mechanical components (e.g., capacitors, resistors, transistors, power supplies, etc.) used to communicatively couple and/or control various electrical components of the assembly 100. For example, the circuit board 102 may include any number of component mounting portions 103, illustrated in FIG. 2, to receive components (e.g., the imaging system 110) to operably couple therewith, and may additionally include a board mounting region 104 used to secure the circuit board 102 with the scanner housing (not illustrated). In the example illustrated in FIG. 2, the circuit board 102 further includes one or more flex tail connected (not illustrated) to communicatively couple components disposed within the chassis 150, and/or the imaging system 110 with the circuit board 102.

Figure 3:
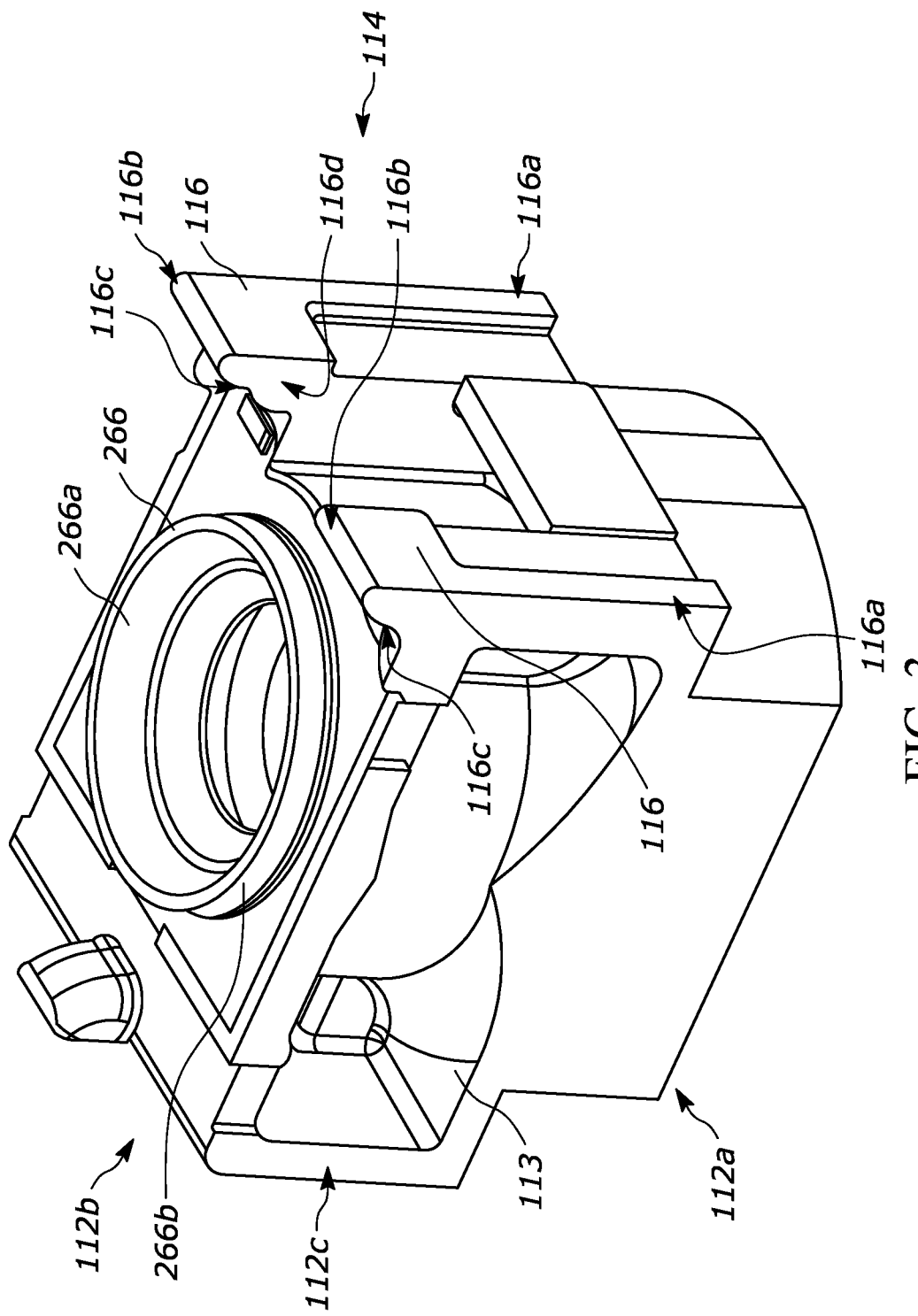
FIG. 3 illustrates a perspective view of an example lens holder for use with the example imaging assembly of FIGS. 1 & 2 in accordance with various embodiments.

The imaging system 110 is also operably coupled with the circuit board 102. The imaging system 110 includes an autofocus system 220 and a rear lens holder 112, both containing lenses for imaging. The autofocus system 220 is positioned adjacent to and/or operably coupled with the rear lens holder 112. FIG. 3 is a perspective view of an example lens holder as the rear lens holder 112 for use with the example imaging system 110 of FIGS. 1 & 2 in accordance with various embodiments. The rear lens holder 112 is in the form of a generally hollow body that defines a lower portion 112a, an upper portion 112b, and a sidewall 112c extending between the lower and upper portions 112a, 112b. The rear lens holder 112 may have any number of features such as shapes and/or cutouts 113 such that the sidewall 112c has a generally uniform thickness despite its unique shape that corresponds to the shape of the lens or lenses disposed therein. These cutouts 113 reduce overall weight of the rear lens holder 112, and due to the uniform thickness of the sidewall 112c, the rear lens holder 112 is easier to manufacture (e.g., mold via an injection molding machine) as compared with lens holders having varying thickness. Each of the different components of the rear lens holder 112 has a fabrication tolerance that may cause two different rear lens holders 112 to be fabricated with different dimensions. These fabrication errors may lead to optical misalignment of optics, such as lenses, that are contained inside of the rear lens holder 112 resulting in image distortion, and/or errors in identifying indicia in scanned images.

In some examples, the rear lens holder 112 is coupled with the circuit board 102 via the component mounting portion 103. As a non-limiting example, the component mounting portion 103 may be in the form of a pad to which the lower portion 112a of the rear lens holder 112 is pressed onto. The component mounting portion 103 may include an adhesive, such as glue, to assist in securing the rear lens holder 112 to the circuit board 102. In other examples, the component mounting portion 103 may include any number of electrical interconnects that receive corresponding electrical interconnects disposed or otherwise coupled with the rear lens holder 112. Other examples are possible.

The rear lens holder 112 further includes a lens holder mounting portion 114 positioned on an outer periphery of the sidewall 112c. The lens holder mounting portion 114 includes any number of upper tabs 116 and any number of lower tabs 120. As illustrated in FIG. 2, each of the upper tabs 116 includes a generally planar facing surface 116a, a curved upper surface 116b positioned adjacent to the facing surface 116a, an angled surface 116c positioned adjacent to the curved upper surface 116b, and an inner sidewall 116d positioned adjacent to the facing surface 116a, the curved upper surface 116b, and the angled surface 116c. In the illustrated example, the respective inner sidewalls 116d of each of the upper tabs 116 are arranged such that they face each other. The angled surface 116c is a generally planar surface that forms an angle relative to the facing surface 116a of approximately 30°. However, other examples of suitable angles are possible. Further, each of the mounting portions 114, upper tabs 116, lower tabs 120, and position of these various elements on the sidewall 112c may have fabrication errors that cause misalignment of any optics, relative to each other and to an image sensor, contained by the rear lens holder 112.

Figure 4:
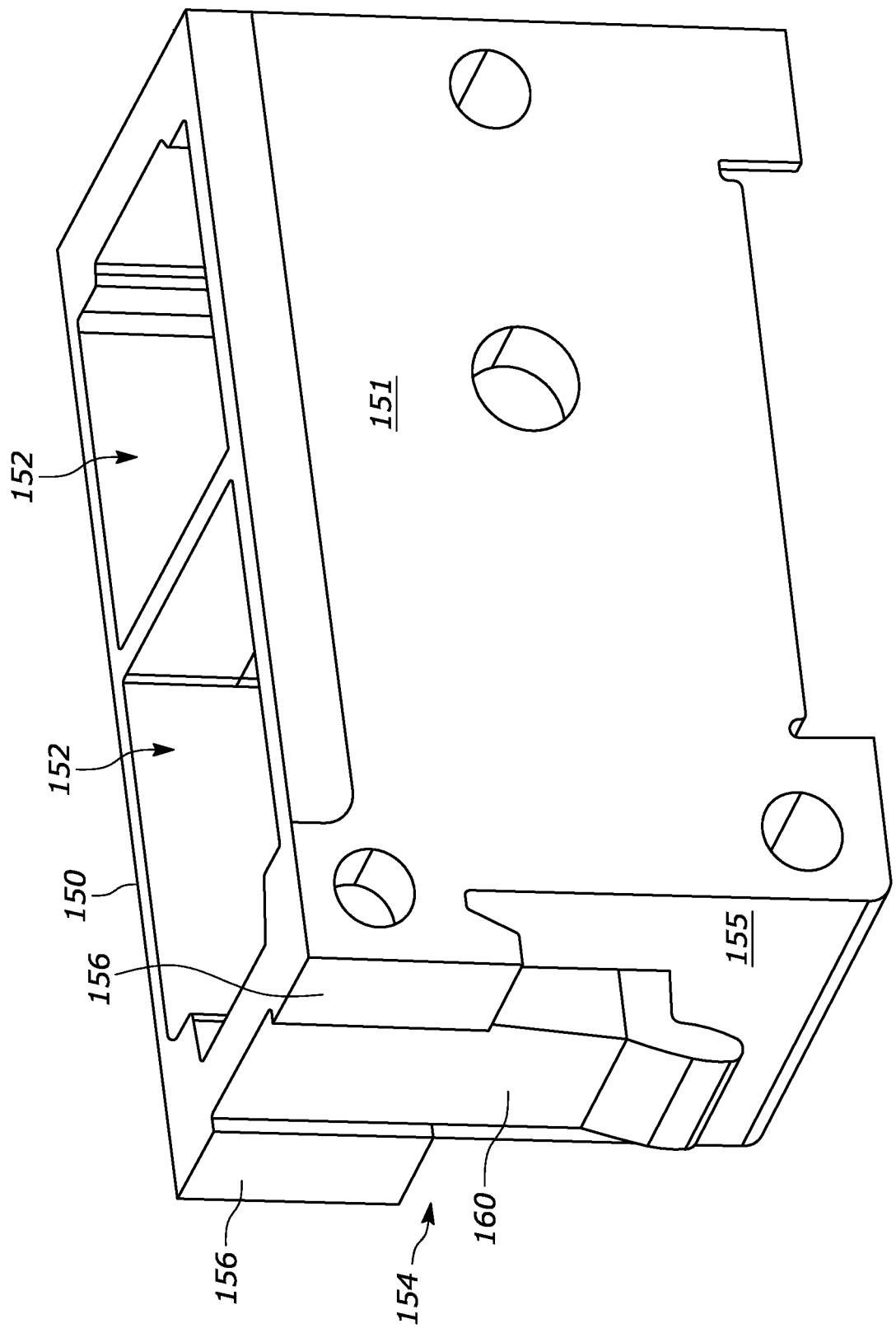
FIG. 4 illustrates a perspective view of an example chassis for use with the example imaging assembly of FIGS. 1 & 2 in accordance with various embodiments.
Figure 5:
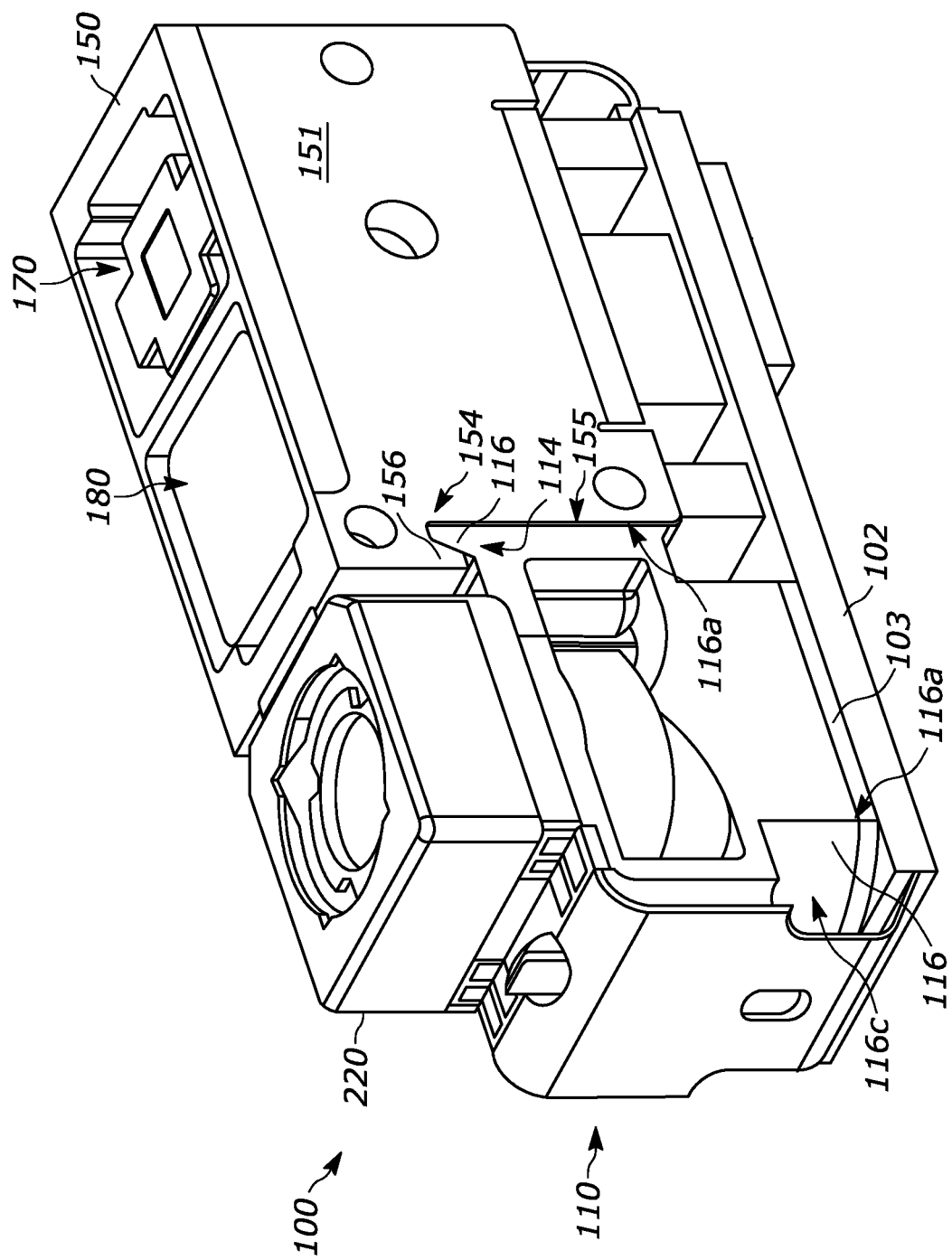
FIG. 5 illustrates a perspective view of the example imaging assembly of FIGS. 1-4 in accordance with various embodiments.

FIG. 4 illustrates a perspective view of an example chassis 150 for use with the example imaging assembly of FIGS. 1 & 2, and FIG. 5 illustrates a perspective view of the example imaging assembly of FIGS. 1-4 in accordance with various embodiments. The chassis 150 may be constructed from a rigid material such as a metal or metal alloy (e.g., zinc). The chassis 150 includes a body 151 that defines any number of cavities 152 in which components may be partially or fully disposed. For example, the aiming system 170 and/or the illumination system 180 may be at least partially disposed within the cavity 152 of the chassis 150. The aiming system 170 may include components to generate a cosmetic pattern to assist with identifying where the imaging system 110 is aiming. In some examples, the aiming system 170 may include laser and/or light emitting diode ("LED") based illumination sources. The illumination system 180 assists with illuminating the desired target for the imaging system 110 to accurately capture the desired image. The illumination system 180 may include an LED or an arrangement of LEDS, lenses, and the like. For the sake of brevity, the aiming system 170 and the illumination system 180 will not be described in substantial detail.

The chassis 150 further includes a chassis mounting portion 154 disposed or positioned on an outer periphery of the body 151 of the cavity 150. The chassis mounting portion 154 includes a reference surface 155, any number of upper hooks 156, and any number of lower hooks 160. The chassis mounting portion 154 may physically couple the chassis 150 to the imaging system 110 to support a physical position and/or alignment of the imaging system 110.

Figure 6:
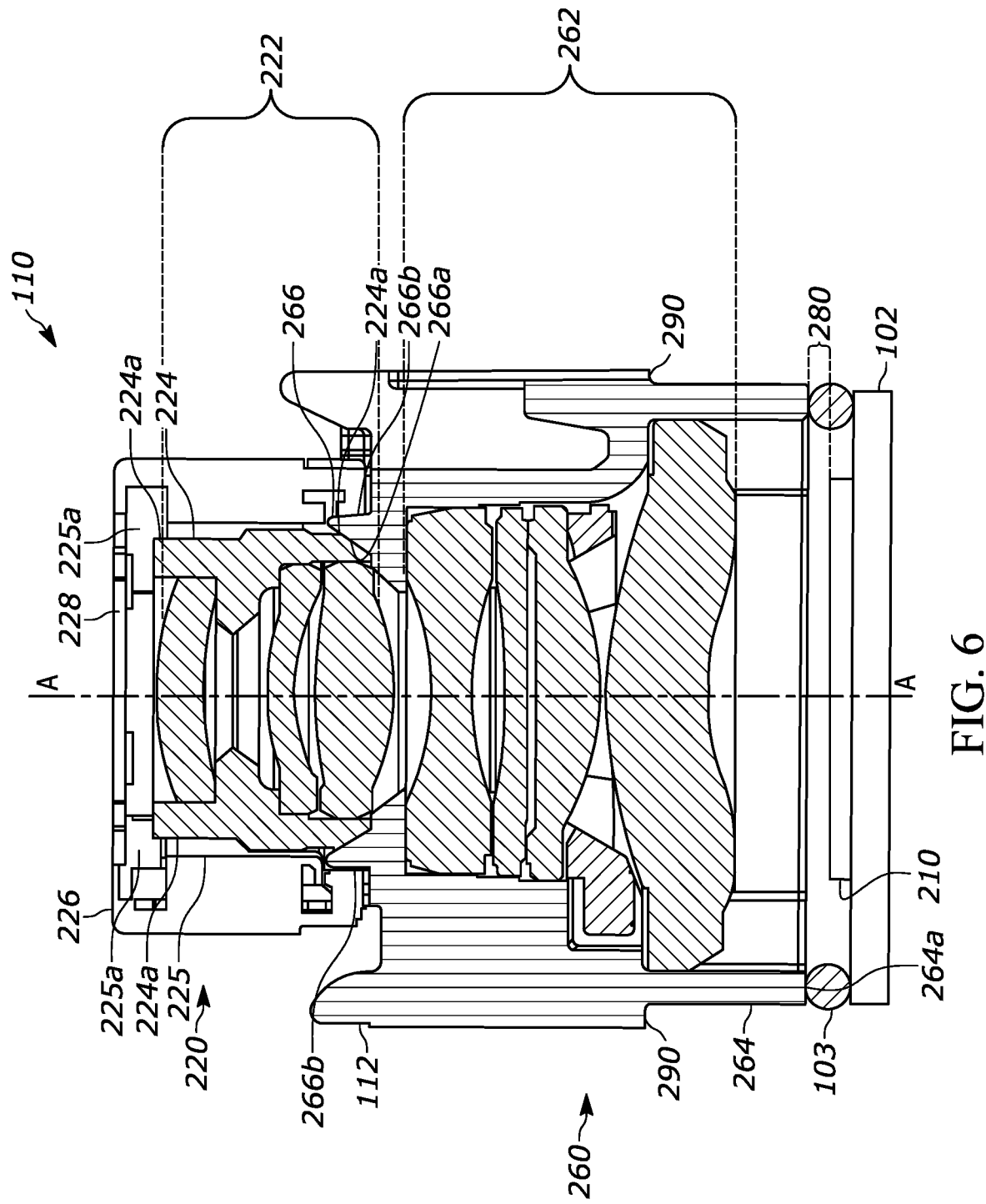
FIG. 6 illustrates a front elevation cross-sectional view of the example imaging system of FIGS. 1-5 in accordance with various embodiments.

FIG. 6 illustrates a front elevation cross-sectional view of the example imaging system 110 of FIGS. 1-5 in accordance with various embodiments. The imaging system 110 is configured to image an object of interest or a target with which may include one or more of a 1D barcode, 2D barcode, QR code, UPC code, or indicia indicative of the object of interest. The imaging system 110 includes the autofocus system 220 and a rear optics system 260.

The autofocus system 220 includes a front lens group 222 and a front lens holder 224. The front lens group 222 is disposed along an optical axis A, and the front lens holder 224 is physically coupled to the front lens group 222 to control a position of the front lens group 222 along the optical axis A and to maintain relative positions of the lenses of the front lens group 222 with respect to each other. An actuator 225 is physically coupled to the front lens group holder 224 to translate the front lens group holder 224 along the optical axis A. Translating the front lens group 222 changes a focal distance of the imaging system 110 for imaging an object of interest. The autofocus system 220 may further include an autofocus mount 226 that houses the front lens group holder 224, and the actuator 225, and maintains a lateral position (i.e., a position along a plane orthogonal to the optical axis A) of the front lens group holder 224, actuator 225, and the front lens group 222. The autofocus mount 226 has a front aperture 228 disposed along the optical axis A to allow light from the object of interest therethrough for scanning of the object of interest.

The rear optics system 260 includes a rear lens group 262 and a rear lens group holder 112. The real lens group holder 112 is physically coupled to lenses of the rear lens group 262 to support and maintain a position of each lens of the rear lens group 262 along the optical axis A. The rear lens group 262 is positioned to receive light from the front lens group 222 for imaging the object of interest. The rear lens group holder 112 has a rear lens barrel flange 264 that may be physically coupled to a component mounting portion 103 to couple the rear lens holder 112 to the circuit board 102 to maintain a position of the autofocus imaging system 110 relative to the imaging sensor 210. The rear lens group holder 112 also has one or more alignment shelves 290 for performing alignment of the optics of the rear and front lens group holder 112 and 224 as described further herein in reference to FIGS. 7-10.

The front lens group holder 224 has an outer cone 224a, and the rear lens group holder has a pilot ridge 266 for aligning the position of the front lens group 222 along the optical axis A with the rear lens group 262. The pilot ridge 266 has a pilot cone 266a, and an outer wall 266b. The pilot cone 266a is a conical surface having an angle that compliments an angle of the outer cone 224a of the front lens group holder 224. The outer cone 224a of the front lens group holder 224 abuts the pilot cone 266a of the pilot ridge 266, physically aligning the front lens group 222 with the rear lens group 262. The outer wall 266b of the pilot ridge 266 may be physically coupled to the outer mount 226 to support and secure a position of the autofocus system 220 relative to the rear lens group holder 112. For examples, the outer mount 226 may be physically coupled to the outer wall 266b by means of a glue, adhesive, epoxy, screw, pin, latch, or other method. The mechanical alignment of the front and rear lens groups 222 and 262 provided by the outer cone 224a and the pilot ridge 266 results in a radial decentration error around the optical axis of less than 0.5 mm, or in embodiments, less than 0.3 mm, as limited by fabrication tolerances of the front and rear lens group holders 224 and 112. Further, some systems require decentration tolerances of less than 0.25 mm, and therefore, further alignment of the optics of the imaging system 110 may be required for scanning of an object of interest.

The actuator 225 is operatively coupled to the front lens group 222, either directly physically coupled to the front lens group 222, or physically coupled to the front lens group holder 224, to control a position of the front lens group 222 along the optical axis A. The actuator 225 has an inner diameter 225a, and the inner diameter 225s of the actuator 225 may be physically coupled to an outer diameter 224a of the front lens group holder 224, for example, by an adhesive.

Translating the position of the front lens group 222 relative to the position of the rear lens group 262 changes the focal distance of the imaging system 110 allowing for imaging of targets or objects of interest at a range of distances from the imaging system 110. In embodiments, the actuator 225 may be include one or more of a voice coil motor, a one-dimensional translation stage, a two-dimensional translation stage, a three-dimensional translation stage, a tip/tilt mount, a piezoelectric device, a ball-bearing linear motor, or a micro-electromechanical systems (MEMS) motor, or another actuator capable of translating the position of the front lens group 222. The actuator 225 may provide a translation distance of 0 mm to 0.5 mm, with 0 mm being at a position with the outer cone 224a of the front lens group holder 224 abutting the pilot cone 266a of the pilot ridge 266. In examples, the actuator 225 may provide translation distances of between 0 mm and 0.3 mm, between 0 and 0.55 mm, between 0 mm and 1 mm, less than 0.5 mm, less than 1 mm, or another translation distance able to be provided by the actuator 225. Further, the focal distance of the imaging system 110 may be tuned from between 2 inches to a focal distance on infinity. As a person of ordinary skill in the art would recognize, a focal distance of infinity enables imaging of collimated, or parallel, optical rays or image fields that are captured by the imaging system 110. Further, a focal distance at infinity allows for imaging of objects at far distances (e.g., greater than 30 feet) from the imaging system 110 that provide approximately collimated beams to the imaging system 110. In embodiments, the focal distance may be tuned from distances smaller than 2 inches to any distance less than infinity, as capable by the actuator 225 and front and rear lens groups 222 and 262.

The actuator 225 may include a processor and a memory wherein the processor determines and/or tracks a current position of the actuator. The processor of the actuator may generate a signal indicative of the current position of the actuator and the processor may provide the signal to the memory. The memory may store data indicative of the current position of the actuator 225, and the processor may retrieve the data and provide the data to other devices. In examples, other processors and systems may have access to the memory and may retrieve data indicative of the current position of the actuator 225 from the memory for further processing. For example, a plurality of images may be captured with the actuator 225 at different positions, and therefore, with the imaging system 110 having different focal lengths. The actuator 225 may provide a current position of the actuator 225 to an external processor or system for each of the captured images. The external processor may then analyze the images and the corresponding positions for performing optical alignment methods as described in further detail with respect to FIGS. 7-10.

The optical axis A may be defined by a lateral position of the imaging sensor 210. The lenses of the front and rear lens groups 222 and 262 are disposed along the optical axis A and are radially centered on the optical axis A. Therefore, radial decentration error, as described herein, refers to an offset or error in lateral position of an optical element, or elements, along the optical axis A. In embodiments, fabrication and manufacture errors may cause misalignment of optics of the front and rear lens groups 222 and 262, and misalignment with the optical axis A. Further, optical tolerances (e.g., a focal distance tolerance of a lens, a radius of curvature tolerance of an optical element, etc.) may also contribute to misalignment of optics in the system. Therefore, additional tuning and optical alignment of the optics may be required to reduce image distortion and for fabrication of low error scanning assemblies. As used herein, the term "alignment" or "misalignment" may refer to how aligned an optical element is with respect to a position along an optical axis, a lateral or radial position on an optical axis, a tilt of an optical element on an optical axis, or another physical alignment of an optical element for imaging of an object of interest.

While the front lens group 222 and the rear lens group 262 are illustrated above as having three and four lenses, respectively, each of the front and rear lens groups 222 and 262 may independently have 1, 2, 3, 4, 5, or more lenses for imaging of the object of interest or target. Further, each lens of the front and rear lens groups 222 and 262 may have a variety of Abbe numbers, optical powers, and be made from a variety materials (e.g., glass, plastic, liquid, etc.) for performing imaging of the object of interest, with each lens having tolerances for each of the described parameters which may contribute to optical misalignment. The lenses of the front and rear lens groups 222 and 262 may have various optical characteristics depending on a desired field of view, range of focal distances, and or F numbers of the imaging system 110. For example, each lens may be configured to independently, or in conjunction, magnify, focus, correct for lens distortion, balance field of curvature of the light, correct spherical aberrations, coma, pupil aberrations, chromatic aberrations, and/or any Seidal aberrations.

The imaging system 110 has a back flange focal distance 280 of less than 0.3 mm, and in embodiments of 0.21±0.03 mm. In examples, the black flange focal distance 280 is less than 0.5 mm, less than 0.25 mm, or less than 0.2 mm, and the back flange focal distance may have tolerances of less than 1 mm, less than 0.75 mm, less than 0.5 mm, less than 0.3 mm, or less than 0.2 mm. The back flange focal distance 280 is typically considered as the distance between the last optical element, or mechanical element, of an imaging system to the imaging plane at the sensor 210. The back flange focal distance 280 may also be referred to as the back focal distance. In the illustration of the imaging system 110, the back flange focal distance 280 is taken as the distance between a bottom surface 264a of the rear lens barrel flange 264 to the imaging plane at the image sensor 210. Imaging systems that employ small area sensors typically require active alignment of the sensor to achieve high levels of image resolution for processing of images. Typically, active alignment of the image sensor 102 requires that the back flange focal distance 280 be greater than tens of microns to ensure that the image sensor 102 does not physically contact the imaging system 110, potentially damaging the image sensor 102 or elements of the imaging system 110. As a result, typical compact imaging systems employ back flange focal distances of greater than a few millimeters, and usually on the order of tens of millimeters to mitigate optical distortion due to dust, dirt, fabrication errors, or incongruities of the lenses. Due to the optical alignment method described herein, the imaging system 110 is able to employ back flange focal distances of less than 1 mm to provide a more compact imaging system while maintaining high resolution and high performance imaging of targets with minimal optical distortion.

Figure 7:
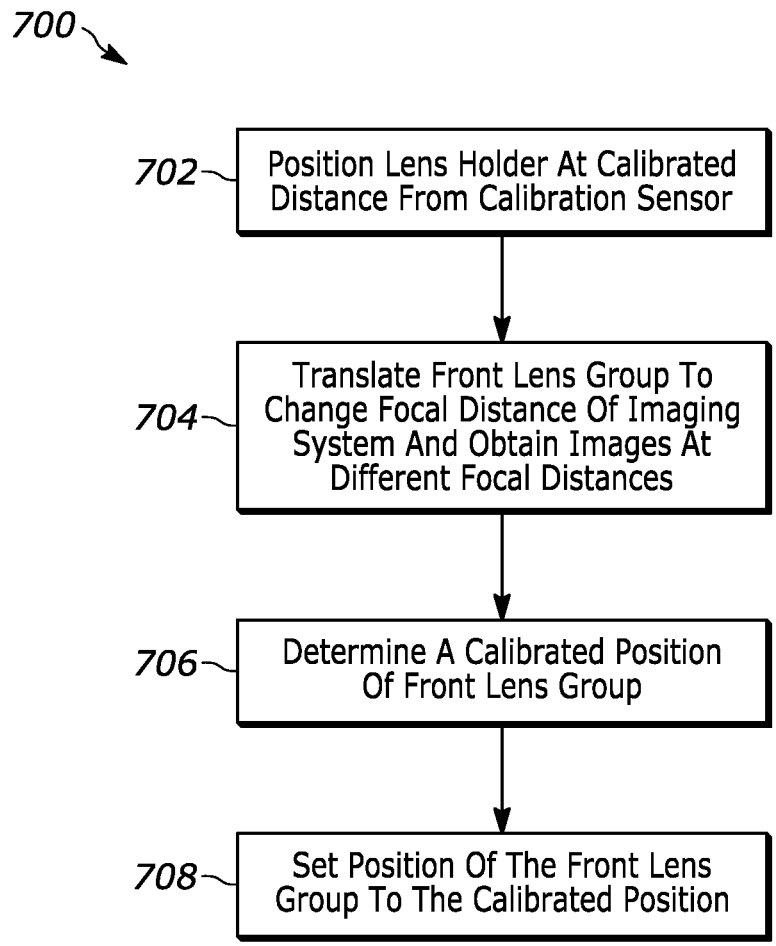
FIG. 7 is a flowchart of a method for performing alignment of an optical assembly with respect to a calibration sensor, as may be performed for the imaging system of FIG. 6.
Figure 8:
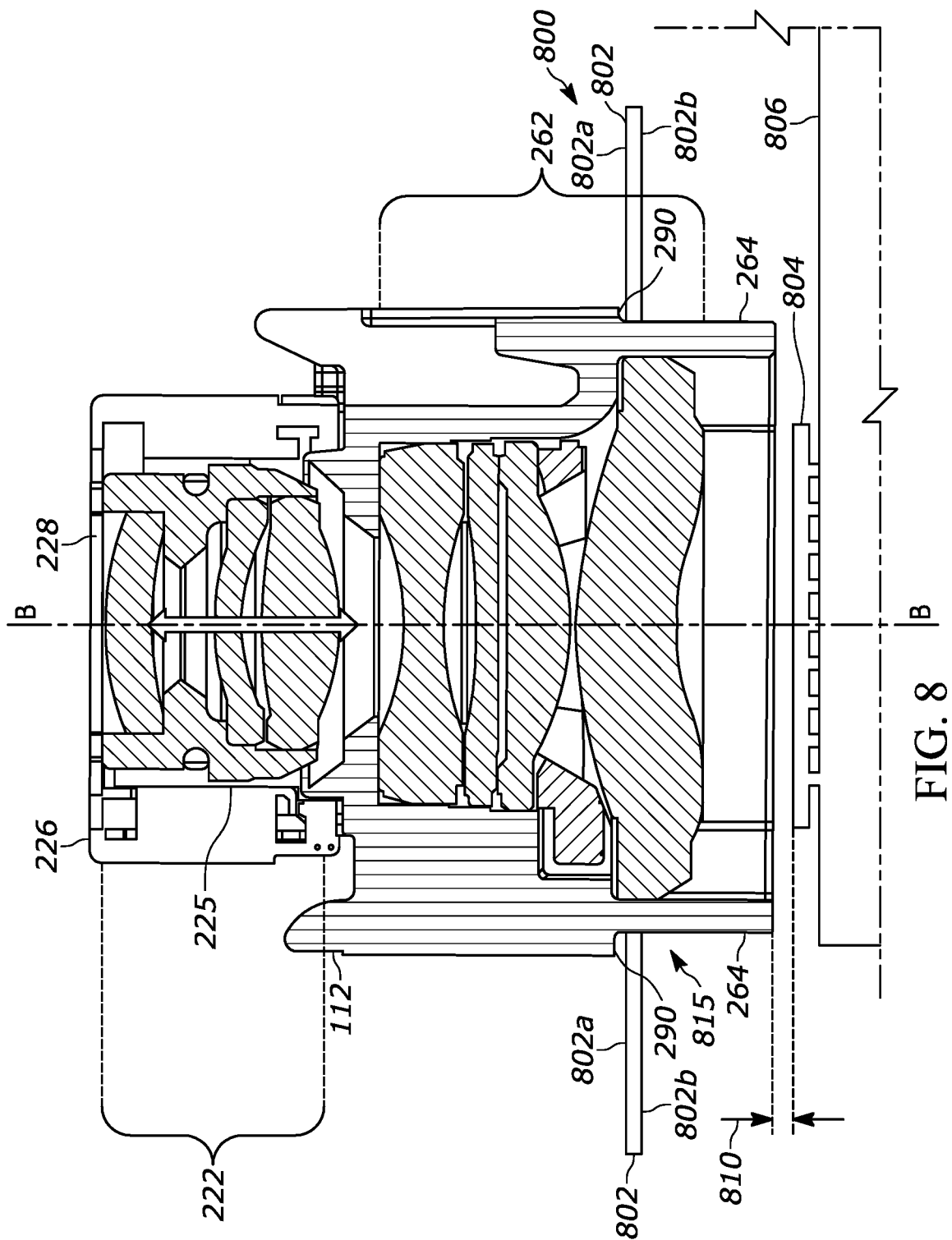
FIG. 8 is a front elevation cross-sectional view of an example imaging alignment apparatus for aligning an optical assembly.

FIG. 7 is a flowchart illustrating a method 700 of aligning an optical assembly of an imaging system in accordance with the present disclosure, and FIG. 8 is a front elevation cross-sectional view of an example imaging calibration apparatus 800 for aligning an optical assembly, such as the imaging system 110. The method 700 may be performed before the imaging system 110 is inserted into, or otherwise coupled to, the circuit board 102 and/or the chassis 150. The method 700 allows for aligning optics of the imaging system 110 to compensate for fabrication and manufacture errors of elements of the imaging system 110 that are unable to be compensated for after the imaging system 110 has been coupled to the circuit board 102 and/or the chassis 150.

Referring simultaneously to FIGS. 7 and 8, at 702 the method 700 includes positioning a lens holder, such as the rear lens group holder 112 of the imaging system 110, along an optical axis B and at a calibrated back flange focal length 810 from a calibration sensor 804. In embodiments, the calibrated back flange focal distance 810 is less than 0.3 mm, and may be 0.21±0.03 mm. In examples, the calibrated black flange focal distance 810 is less than 0.5 mm, less than 0.25 mm, or less than 0.2 mm, and the calibrated back flange focal distance 810 may have a tolerance along the optical axis B of less than 1 mm, less than 0.75 mm, less than 0.5 mm, less than 0.3 mm, less than 0.1 mm, less than 0.05 mm, less than 0.03 mm, or less than 0.02 mm. The aperture 228 of the imaging system 110 is disposed along the optical axis B configured to receive light from a target or object of interest therethrough. Further, the rear lens barrel flange 264 of the rear lens group holder 112 is disposed along the optical axis B at the calibrated back flange focal to allow light from the object of interest to exit the imaging system 110 to provide light to the calibration sensor 804. The rear lens barrel flange 264 is positioned at a distance equal to the calibrated back flange focal length 810 from the calibration sensor 804.

In examples, the rear lens group holder 112 may be mounted on a calibration mount 802. As illustrated in FIG. 8, the calibration mount 802 may be a plane with a first surface 802a and a second surface 802b that is opposite the first surface 802a. The lens calibration mount 802 of FIG. 8 has a central aperture 815 that the rear lens barrel flange 264 is inserted into. The one or more alignment shelves 290 abut the first surface 802a of the calibration mount 802 to position the rear lens barrel flange 264 at the calibrated back flange focal length 810 from the calibration sensor 804. The calibration sensor 804 is disposed on a calibration sensor board 806 in a fixed position at a fixed distance to the calibration mount 802. The fixed relative positions of the calibration sensor 804 and the calibration mount 802 ensures that the calibrated back flange focal length 810 remains calibrated and consistent over time. Maintaining a consistent back flange focal length 810 allows for the fabrication of fine-tuned optical alignment imaging systems, across multiple fabrications.

While illustrated as a plane with the central aperture 815, the calibration mount may include one or more clamps, vices, translational stages, or other physical elements for supporting and maintaining the position of the imaging system 110 at the calibrated back flange focal length 810.

At 704, the actuator 225 translates the front lens group 222 to a plurality of positions along the optical axis B, and the calibration sensor 804 captures an image of a target at each of the positions of the front lens group 222. Further, the actuator 225 may store position data at each position of the actuator 225, with the position data corresponding to a respective image captured by the calibration sensor 804. The focal distance of the imaging system 110 changes as the front lens group 222 is translated along the optical axis B. Therefore, the image quality of the image received by the calibration sensor 804 varies as the front lens group is translated. The calibration sensor 804 may be in electrical communication with a computer or processor (not illustrated), and the calibration sensor 804 may provide the processor with a plurality of signals indicative of the images detected by the calibration sensor 804. The calibration sensor 804 may be in communication with off board processors, networks, and devices by electrical communication via the calibration sensor board 806, or the calibration sensor board 806 may include processors and image processing chips, and the calibration sensor may provide signals indicative of the image to the processors and chips of the calibration sensor board 806. Further, processors of the calibration sensor board 806 may obtain, from the actuator 225, positions corresponding to the images for determining an optimal position of the actuator 225.

At 706, the processor determines a calibrated position of the front lens group 222. To determine the calibrated position, the processor may analyze, or perform image processing on the plurality of signals indicative of the images and determine an optimal image from the obtained images. For example, the processor may analyze the plurality of signals to determine an image quality metric associated with each image, and the processor may determine an optimal image based on the determined image quality metric. For example, the processor may analyze each signal of the plurality of signals and the processor may determine a contrast value as the image quality metric, for each of the images. The processor may then identify the image having the highest contrast value, and the position of the front lens group 222 associated with the identified image may be determined to be the calibrated position. In other examples, the image quality metric may include one or more of an image resolution, an edge detection value, a pixel per module value, a modulation transfer function value, a contrast value, a sharpness score, a maximum variance of pixel intensity, or a standard deviation value of pixel intensity among other metrics indicative of an image or image quality. At 708, the actuator 225 sets the position of the front lens group to the calibrated position.

In examples, the rear lens group 262 may also be translatable along the optical axis B. The position of the rear lens group 262 may be controlled by an actuator, or manually controlled using translation stages and other optical elements and mounts. In embodiments with a translatable rear lens group 262, the process 700 may further include translating the position of the rear lens group 262 along the optical axis B to a plurality of positions, and obtaining a plurality of secondary images with each image obtained at a different position of the rear lens group 262. Similarly to the front lens group 222, translating the rear lens group changes the focal distance of the imaging system 110, and, therefore, each of the second plurality of images detected by the calibration sensor 804 will have different image qualities at each of the positions of the rear lens group 262. The calibration sensor 804 may provide the processor with signals indicative of the images, and the processor may determine an image quality metric for each image of the second plurality of images. The processor may then identify, from the image quality metrics, a calibrated image of the second plurality of images. The processor may then identify a calibrated position of the rear lens group 262 from the calibrated image.

In embodiments, both of the front lens group 222 and the rear lens group 262 may be translatable, and the method 700 may be performed iteratively to fine tune the calibrated positions of the front and rear lens groups 222 and 262. For example, the method 700 may first determine a calibrated image of the front lens group, and then the rear lens group 262 may be translated to further fine tune an image (e.g., as determined by an image quality metric) on the calibration sensor. The processor may then determine a calibrated image of the second lens group 262, and the imaging system 110 may maintain the position of the second lens group 262 at the determined calibrated position of the second lens group 262. The method 700 may then be repeated for the first lens group 222 to further fine tune the calibrated position of the first lens group 222 in reference to the calibrated position of the second lens group 262.

Figure 9:
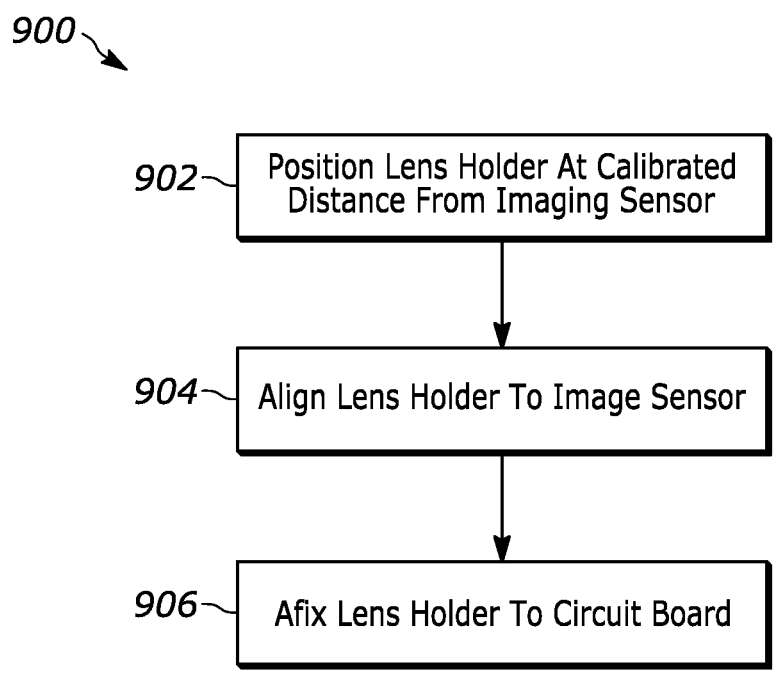
FIG. 9 is a flowchart of a method for performing alignment of an optical assembly with respect to an imaging sensor, as may be performed for the imaging system of FIG. 6.
Figure 10:
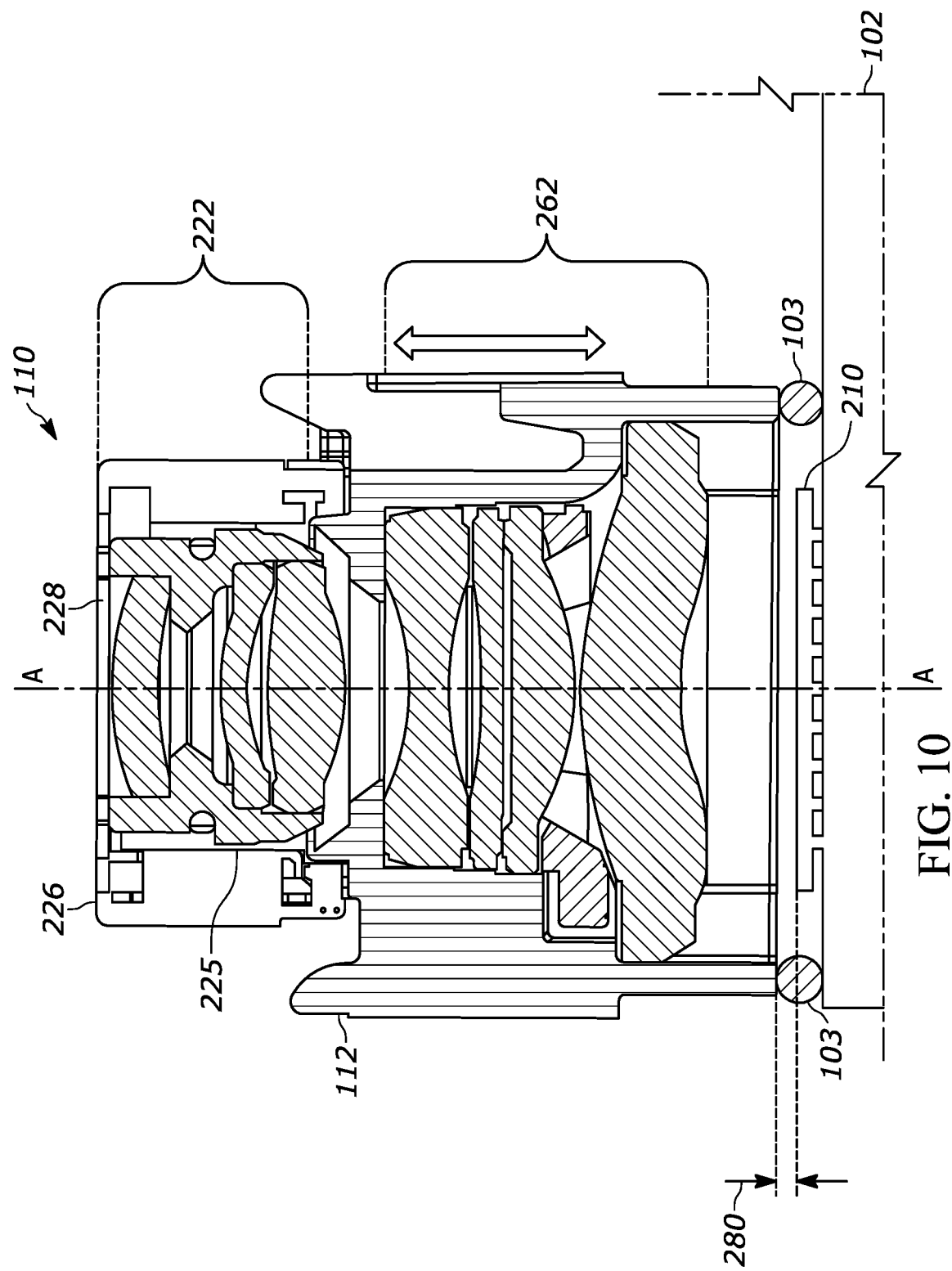
FIG. 10 is a front elevation cross-sectional view of a fabricated optical assembly that is aligned according to the methods of FIGS. 7 and 9.

FIG. 9 is a flowchart illustrating a method 900 of aligning an optical assembly, such as the imaging system 110, with the imaging sensor 210 on the circuit board 102 for fabricating the assembly 100 as illustrated in FIGS. 1 and 2. FIG. 10 is a front elevation cross-sectional view of an example of aligning the imaging system 110 with the imaging sensor 210. Referring simultaneously to FIGS. 9 and 10, at 902, the method includes positioning a lens holder, such as the rear lens group holder 112 of the imaging system 110, at a predetermined back flange focal distance 280 from the imaging sensor 210. The predetermined back flange focal distance 280 may be a same distance as the calibrated back flange focal distance 810 as described in reference to FIGS. 8 and 9. Therefore, the predetermined back flange focal distance 280 may be determined by the geometries of the imaging calibration apparatus 800, and specifically by the calibrated back flange focal distance 810 of the imaging calibration apparatus 800.

The imaging system 110 may be physically coupled to the circuit board 102 by the component mounting portion 103. Therefore, the component mounting portion 103 may mount the rear lens group holder 112 of the imaging system 110 at the calibrated back flange focal distance 810. The component mounting portion 103 may be an adhesive bead, or adhesive layer with a corresponding thickness to support the position of the imaging system 110 at the calibrated back flange focal distance 810. In examples, the component mounting portion 103 may include one or more of an adhesive, an epoxy, an O-ring, a physical layer such as a metal or plastic layer physically coupled to the rear lens group holder, 112, bolts or screws may be used to attach the rear lens holder 112 directly to the circuit board 102, or another mounting component for maintaining a position of the imaging system 110 at the calibrated back focal flange distance 810.

At 904, the method 900 includes aligning the imaging system to the imaging sensor 210 along the optical axis A. The alignment of the imaging system 110 may include an active alignment of the optics of the imaging system 110. Active alignment may include translating the entire imaging system 110 along the optical axis A to focus an image on the imaging sensor 210, and determining a calibrated active alignment position of the imaging system 110 along the optical axis A. The translation of the imaging system along the optical axis A may be performed by hand, by translations stages, with actuators or other translatable mounts either manually or automatically by a processor. During the active alignment the imaging system 110 may be translated using step sizes of less than 5 microns, less than 10 microns, less than 25 microns, less than 50 microns, less than 100 microns, or less than 500 microns along the optical axis A of the imaging sensor 210.

Active alignment may include translating the imaging system 110 in the plane orthogonal to the optical axis A to position an image on the imaging sensor 210, and determining a calibrated orthogonal position. The translation of the imaging system 112 in the plane orthogonal to the optical axis A may be performed by hand, by translations stages, with actuators or other translatable mounts either manually or automatically by a processor. During the active alignment, the imaging system 110 may be translated orthogonal to the optical axis A using step sizes of less than 5 microns, less than 10 microns, less than 25 microns, less than 50 microns, less than 100 microns, or less than 500 microns.

The active alignment may further include tilting the imaging system 110 to focus the image on the imaging sensor, and determining a calibrated tilt alignment of the imaging system 110 from the image. Tilting the imaging system 110 may be performed by a tilt stage, tilt mount, tip-tilt mount, a rotational stage, and either manually or automatically by a processor and control electronics. During the active alignment, the imaging system 110 may be tilted around three angular axes $\theta_x$, $\theta_y$, $\theta_z$, independently, at a minimum incremental motion of 12 μrad.

In embodiments, performing active alignment of the optics and the imaging system 110 may not be necessary. For example, the component mounting portion 103 may physically support and maintain the position of the rear lens group holder 112 at the calibrated back flange focal distance 280 using a fixed thickness spacer, removing the need for tuning the imaging system 110 along the optical axis A. Further, the component mounting portion 103 may be a physical spacer that is designed to compensate for any tilt and orthogonal translation positioning of the imaging system for providing images to the imaging sensor 210.

At 906, the rear lens group holder 212 is affixed to the circuit board 102, with the optics of the imaging system 110 aligned with the imaging sensor 210 along the optical axis A. The rear lens group holder 212 may be affixed to the circuit board 102 by the component mounting portion 103. In additional to the centration of the front and rear lens groups 222 and 262, the alignment of the imaging system 110 also allows for the component mounting portion 103 to have a thickness of less than 1 mm. For example, the component mounting portion 103 may be a bead of glue or another adhesive that is approximately 0.5±0.2 mm. The bead of glue may be applied to the rear lens group holder 212 while the imaging system 110 is held in at the calibrated back flange focal distance from the imaging sensor 210. Further, the bead of glue may be applied to the rear lens group holder 112 and the circuit board 102 while the rear lens group holder 212 is held at the calibrated active alignment position along the optical axis A, calibrated orthogonal position, and calibrated tilt alignment of the rear lens group holder 212. In examples, the component mounting portion 103 may include one or more of an adhesive, a tape, a clamp, an optical mount, a lens tube, a screw, a washer, or another element capable of physically coupling the rear lens group holder 212 to the circuit board 102.

Reducing the thickness of the component mounting portion 103 reduces any defocusing of the image plane of the front and rear lens groups 222 and 262 with the image sensor 210. Defocusing effects of thicker component mounting portions 103 include thickness fluctuations due to temperature changes, pressure changes, humidity changes, or material degradation of the component mounting portion. Enabled by the alignment procedures described herein, the thin component mounting portion 103 with back flange focal distances 280 of less than 0.5 mm allows for more compact imaging systems having the optical benefits of a large range of focal lengths and reduced defocusing over time as compared to other imaging systems.

In embodiments, the method 900 may further include translating, by the actuator 225, the front lens group 222 along the optical axis A to fine tune the focal distance of the imaging system 110 after affixing the rear lens group holder 212 to the circuit board 102. Translating the front lens group 222 further focus an image on the imaging sensor 210 and a fine-tune position of the front lens group 222 may be determined manually by a user or operator, or automatically by a processor through image processing and image analysis. The method 900 may determine a fine-tune position of the front lens group 222 and a processor may store data indicative of the fine-tune position of the front lens group 222. The actuator 225 may provide the data indicative of the fine-tune position to the processor, and the processor may store the fine-tune position in a memory.

All of the features described above contribute to the compact form factor of the imaging system 110. For example, the imaging system may have a length (i.e., distance from the aperture 228 to the circuit board 102) of less than 12 mm, a height (as described above in reference to FIG. 9) of less than 8 mm, and a width of less than 10 mm. So configured, and as illustrated in FIG. 9, the imaging system 110 described herein may occupy an entire available height between the opposing large flat mounting surfaces of the chassis 150 as compared with being constrained by the body 151 of the chassis 150. Further, instead of the chassis 150 being mounted directly to the circuit board 102, the imaging system 110 is mounted directly to the circuit board 102 while the chassis 150 is coupled with the imaging system 110, and indirectly coupled to the chassis 150. Advantageously, such an arrangement isolates heat of the aiming system 170 and the illumination system 180 disposed within the chassis 150 from the image sensor 210 mounted on the circuit board 102, while also providing for additional optical path length for the imaging system 110.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions.

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

We claim:

1. A method of alignment assembly of an imaging system, the method comprising:
positioning a lens holder at a calibrated back flange focal length from a calibration sensor, the calibration sensor disposed along an optical axis to receive an image thereon, the lens holder positioned along the optical axis and having a front aperture along the optical axis and a back flange along the optical axis, and the lens holder containing a front lens group disposed along the optical axis and a rear lens group disposed along the optical axis;
translating, by an actuator, the front lens group to a plurality of positions along the optical axis, while maintaining the rear group in a fixed position relative to the calibration sensor, to change a focal distance to focus the image onto the calibration sensor;
determining, by a processor, a calibrated position of the front lens group, the calibrated position being a position with a calibrated image focused at the calibration sensor; and
setting, by the actuator, the front lens group to the calibrated position.

2. The method of claim 1, further comprising re-positioning the lens holder relative to an image sensor at a predetermined distance from the lens holder.

3. The method of claim 2, wherein the lens holder is re-positioned with the back flange of the lens holder being positioned at the calibrated back flange focal length from the image sensor.

4. The method of claim 2, wherein re-positioning the lens holder relative to the image sensor comprises re-positioning the lens holder at a distance from the image sensor, the distance determined by a physical spacer disposed between the lens holder and the image sensor.

5. The method of claim 2, further comprising actively aligning the lens holder to the image sensor.

6. The method of claim 1, further comprising:
providing, by the actuator, data indicative of the calibrated position to the processor; and
storing, by the processor, the data indicative of the calibrated position in a memory.

7. The method of claim 1, wherein the calibrated back flange focal length of less than 0.25 millimeters.

8. The method of claim 1, wherein the calibrated back flange focal length has a position tolerance along the optical axis of less than 50 microns.

9. The method of claim 1, wherein the calibrated back flange focal length has a position tolerance of ±0.03 mm or less.

10. The method of claim 1, wherein positioning the lens holder at the calibrated back flange focal length from the calibration sensor comprises placing the lens holder on a calibration apparatus having a lens holder mount configured to maintain the position of the lens holder at the calibrated back flange focal length from the calibration sensor.

11. The method of claim 1, wherein actively aligning the lens holder comprises:
translating the lens holder along an optical axis of an image sensor to focus an image on the image sensor;
determining a calibrated active alignment position along the optical axis; and
affixing the lens holder to a sensor board, the sensor board having the image sensor thereon.

12. The method of claim 11, wherein actively aligning the lens holder further comprises:
translating the lens holder in a plane orthogonal to the optical axis to position the image on the image sensor;
tilting the lens holder to focus the image on the image sensor;
determining a calibrated tilt alignment of the lens holder relative to the image sensor; and
translating the lens holder in the plane orthogonal to the optical axis to position the image on the image sensor;
determining a calibrated orthogonal position of the lens holder relative to the image sensor.

13. The method of claim 11, wherein translating the lens holder along the optical axis of the image sensor is performed with less than 25 micron step sizes along the optical axis of the image sensor.

14. The method of claim 11, wherein affixing the lens holder to the sensor board comprises physically coupling the lens holder to the sensor board with an adhesive.

15. The method of claim 11, further comprising:
translating, after affixing the lens holder to the sensor board, and by the actuator, the front lens group along the optical axis of the image sensor to fine tune the focal distance of the imaging system by focusing the image on the image sensor;
determining, by the processor, a fine-tune position of the front lens group;
providing, by the actuator, data indicative of the fine-tune position to the processor; and
storing, by the processor, the data indicative of the fine-tune position in a memory.

16. The method of claim 1, wherein the actuator comprises one of a voice coil motor, a one-dimension translation stage, a piezoelectric device, a ball-bearing linear motor, or a microelectromechanical systems (MEMS) motor.

17. The method of claim 1, wherein the actuator is configured to translate the front lens group a distance of 0 to 550 microns.

18. The method of claim 1, wherein the actuator includes a processor and a memory and wherein the method further comprises:
determining, by the processor of the actuator, a current position of the actuator;
generating, by the processor of the actuator, a signal indicative of the current position; and
storing, in the memory of the actuator, data corresponding to the signal indicative of the current position.

19. The method of claim 1, wherein the focal distance of the imaging system may be tuned from 2 inches to infinity.

20. The method of claim 1, wherein a distance from the aperture to the sensor is less than 12 millimeters.

* * * * *